United States Patent [19]

Sullivan

[11] Patent Number: 4,614,247
[45] Date of Patent: Sep. 30, 1986

[54] COMPOSITE MULTI-AXLE SUSPENSION FOR VEHICLES

[75] Inventor: John W. Sullivan, Sidney, Ohio

[73] Assignee: Airstream, Inc., Jackson Center, Ohio

[21] Appl. No.: 665,068

[22] Filed: Oct. 26, 1984

[51] Int. Cl.[4] .......................................... B62D 61/10
[52] U.S. Cl. ................... 180/24.02; 280/6 R; 280/712; 280/DIG. 1
[58] Field of Search ............. 280/6 R, 712, DIG. 1; 180/24.02

[56] References Cited

U.S. PATENT DOCUMENTS

| | | | |
|---|---|---|---|
| 2,742,301 | 4/1956 | Pointer | 280/683 |
| 2,777,529 | 1/1957 | Harbers | 180/24.02 |
| 2,864,453 | 12/1958 | La Belle | 180/24.02 |
| 2,864,454 | 12/1958 | La Belle | 180/24.02 |
| 2,967,064 | 1/1961 | Valentine | 280/714 |
| 3,037,788 | 6/1962 | Haddad | 280/714 |
| 3,053,335 | 9/1962 | Gnade et al. | 180/24.02 |
| 3,094,341 | 6/1963 | Alfieri | 280/DIG. 1 |
| 3,197,231 | 7/1965 | Holzman | 280/683 |
| 3,208,168 | 9/1965 | Henschen | 37/97 |
| 3,436,069 | 4/1969 | Henschen | 267/57.1 R |
| 3,494,632 | 2/1970 | Bostrom | 280/683 |
| 3,499,662 | 3/1970 | Paul | 280/712 |
| 3,782,753 | 1/1974 | Sweet et al. | 280/712 |
| 4,047,736 | 9/1977 | Prive | 280/683 |
| 4,097,034 | 6/1978 | Sweet et al. | 280/712 |
| 4,222,578 | 9/1980 | Meisel, Jr. | 280/6.11 |

Primary Examiner—John J. Love
Assistant Examiner—Kenneth R. Rice
Attorney, Agent, or Firm—Killworth, Gottman, Hagan & Schaeff

[57] ABSTRACT

A multi-axle suspension system for large motor homes, buses and like vehicles provides load dividing, improved vehicle stability and handling, a smoother ride and a driver selectable range of variable braking. The system also maintains an optimum chassis frame height under varying vehicle loading. A tag axle behind the vehicle drive axle includes a trailing arm which rotates upwardly or downwardly in response to an increase or decrease in vehicle loading. Such rotation operates a control linkage of a pressurized fluid control valve to supply additional fluid to or exhaust fluid from a spring device having supportive engagement with the vehicle chassis frame. A constant portion of the vehicle load is maintained on the tag axle at all times.

15 Claims, 6 Drawing Figures

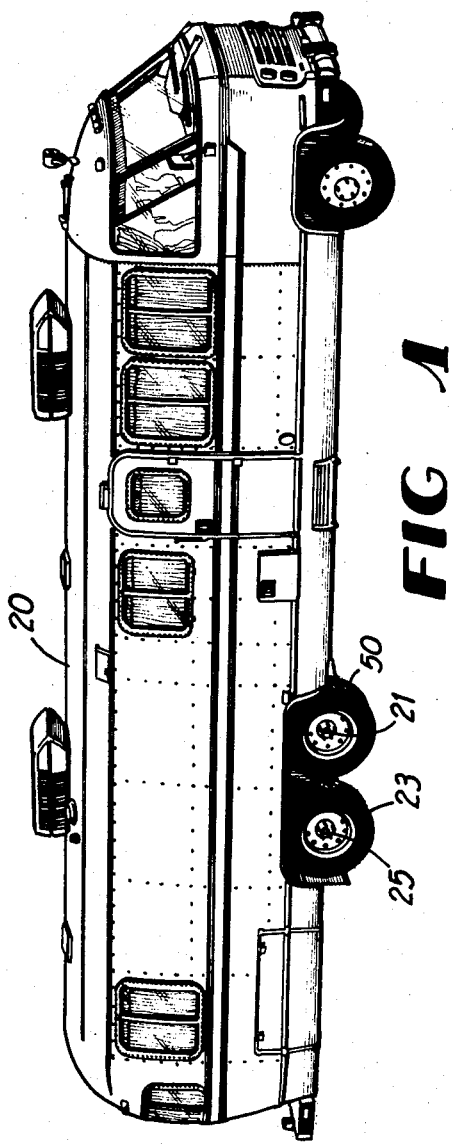
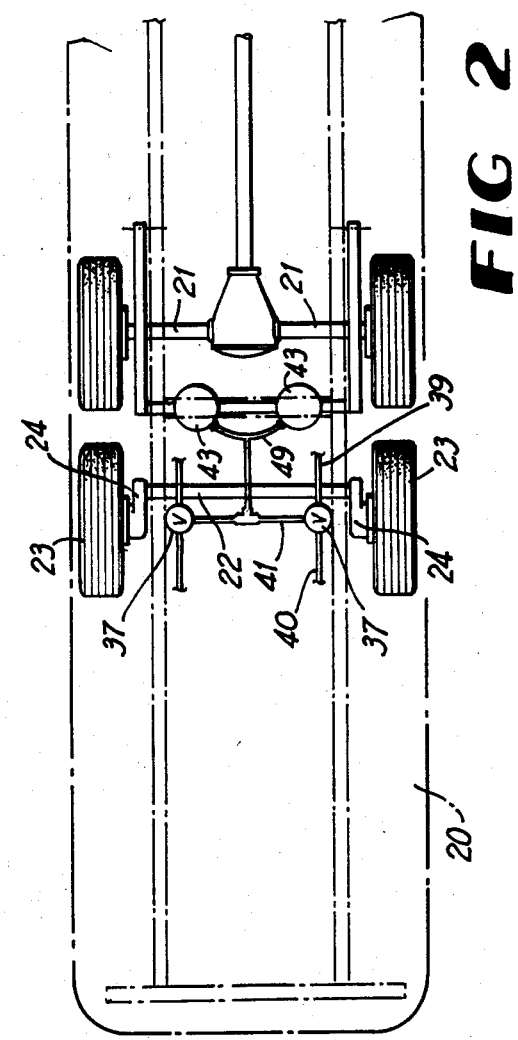

COMPOSITE MULTI-AXLE SUSPENSION FOR VEHICLES

BACKGROUND OF THE INVENTION

The present invention arises as a result of a long-felt need for an improved suspension system for multi-axle vehicles, such as large motor homes and buses. Because of their weight and high centers of gravity, vehicles of this type tend to lack stability on the highway, are frequently deficient in braking performance and handling compared to other vehicles on the road, and provide less than optimum ride from a comfort standpoint. The present invention in terms of a broad objective seeks to substantially eliminate or dramatically improve upon the above and other known deficiencies of prior art suspension systems for vehicles of the class mentioned.

The prior art contains many teachings on vehicular suspension systems which seek mainly to maintain the vehicle in a level stance under varying conditions of loading and/or braking. The known prior art suspensions for vehicles of the type on which the present invention is employed compensate for changes in vehicle loading by maintaining the chassis frame at a design elevation under all conditions of loading between empty and fully loaded. The prior art suspension systems do not possess the ability to improve dramatically the fore/aft or lateral stability of the vehicle within the range of normal and highway speeds, so that emergency lane changing, braking and like maneuvers can be safely carried out. The present invention possesses the above and other capabilities which are absent in the prior art.

A further and more specific object of the invention is to provide an improved suspension for motor homes, buses and the like in which the provision of a tag axle in association with the drive axle of the vehicle and a fluid-pressure operated spring means constantly divides the total vehicle load between the drive axle and tag axle, maintaining a constant portion of the load on the tag axle at all times and under all variations in static and dynamic loading between an empty vehicle and a fully loaded vehicle. This load dividing capability of the invention forms the basis of the greatly improved handling and stability of the vehicle, more effective braking, greater passenger comfort and avoidance of loss of road traction when the tag axle rolls up onto a curb or other elevated surface resulting in lifting of the vehicle drive or traction wheels.

Other features and advantages of the invention will become apparent to those skilled in the art during the course of the following description.

SUMMARY OF THE INVENTION

In achieving the stated objectives of the invention and eliminating the deficiencies of the prior art, the present invention embodies a preferably torsion-type tag axle assembly securely bracketed to the vehicle chassis frame in tandem relationship to the vehicle drive axle and behind the same. The tag axle assembly includes independently sprung wheels journaled on vertically swingable arms of the axle assembly which are operatively connected through adjustable linkages with a pair of pressurized fluid control and distribution valves receiving fluid from an on-board supply. The two valves can deliver the pressurized fluid to, or exhaust fluid from, a pair of connected pressurized fluid springs, such as air springs, supportively engaged with the chassis frame of the vehicle and being themselves supported on parts of the drive axle structure. In operation, a constant comparatively small portion of the total vehicle load is maintained on the tag axle assembly and the movements of the tag axle swinging arms through the valve operating linkages and fluid control and distribution valves distributes any increased vehicle load between the vehicle drive axle and front axle, thus diminishing variations in the center of gravity of the vehicle.

BRIEF DESCRIPTION OF THE DRAWINGS

FIG. 1 is a perspective view of the invention applied to a motor home.

FIG. 2 is a partly schematic plan view of the suspension system according to the invention.

DETAILED DESCRIPTION

Figure 3:
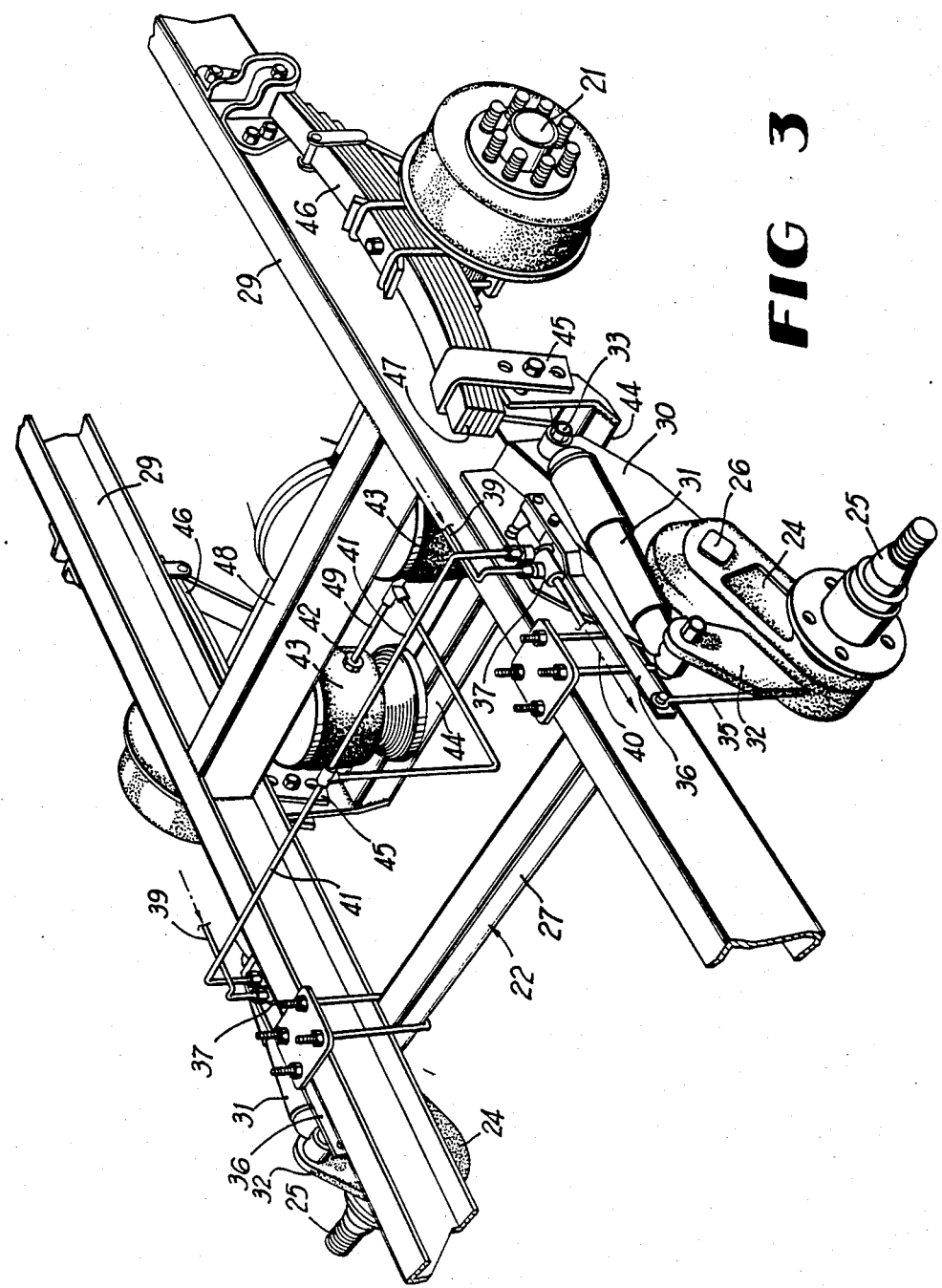
FIG. 3 is an enlarged perspective view of the suspension system.

Referring to the drawings in detail wherein like numerals designate like parts throughout the same, a motor home 20 or like vehicle is equipped with a composite multi-axle suspension system according to the present invention, which system includes near the rear of the vehicle a drive axle 21 and a tandem tag axle 22. Preferably, but not necessarily, the tag axle 22 is of the type disclosed in U.S. Pat. Nos. 3,208,168 and 3,436,069, issued to Henschen. Other forms of tag axles can be employed, if desired.

In the Henschen-type axle 22, the two wheels 23 thereof are independently sprung and are journaled independently on two trailing parallel vertically swingable arms 24. The arms 24 carry spindles 25 for the two wheels 23. The forward ends of the arms 24 are secured to square shafts 26 disposed inside of a square tube 27 in accordance with the referenced Henschen patents, resilient cushioning elements 28 being held between the square shaft 26 and square tube to provide torsional resistance to the rising or falling of each arm 24 independently from a neutral position. The ends of the Henschen tag axle square tube 27 are securely attached to the chassis rails 29 of the vehicle by brackets 30. Preferably, the swingable arms 24 are snubbed by shock absorbers 31 connected between extensions 32 of the arms 24 and attachment points 33 on the brackets 30.

Each independent arm 24 of the tag axle 22 is pivotally connected at 34 to an adjustable operating linkage 35 including a lever arm 36 connected to the rotary spool element of a pressurized fluid control and distribution valve 37. Each valve 37 is secured by a bracket 38 to an adjacent stationary support surface on the vehicle chassis frame. The valve 37 is of a commercial type manufactured by Nelson Metal Products, Midland-Ross Corp., 2950 Prairie St., Grandville, Mich. 49418, No.H450-13 and -14, left hand and right hand.

Each valve 37 receives pressurized fluid, preferably compressed air, from an on-board source, not shown, through a delivery line 39. Each valve has an exhaust or return line 40 and a pressurized fluid delivery or outlet line 41 leading to and connected with an inlet fitting 42 of one of a pair of air springs 43. The air springs 43 per se are conventional and are preferably of the kind manufactured and sold by Firestone Industrial Products, Noblesville, Ind., as No. 1T14F-4, or an equivalent device.

The two air springs 43 are supported on an underslung transverse horizontal beam 44 suspended by adjustable brackets 45 from the two leaf spring assemblies 46 which support the adjacent chassis rails 29 of the vehicle at the drive axle 21. As shown in the drawings, the rear end portions of the leaf springs 46 have been cut off at 47 and the brackets 45 are welded directly to the foreshortened rear end portions of the leaf springs. The tops of the air springs 43 engage a sturdy cross member 48 of the chassis frame of the vehicle and are suitably attached thereto. As will be further discussed, when the air springs 43 receive air through the lines 41 from the valves 37, they exert an upward lifting force on the vehicle chassis and when the air is exhausted from the springs 43 through the valves 37 and their exhaust lines 40, the lifting force exerted by the air springs on the chassis frame is relieved.

The two air springs 43 are functionally interconnected by a line 49 so that they may function as one spring. They can also act as independent springs, depending upon the time related functioning of the interconnecting line 49. The two air springs are near and somewhat inwardly of the opposite side rails 29 of the chassis frame.

Figure 4:
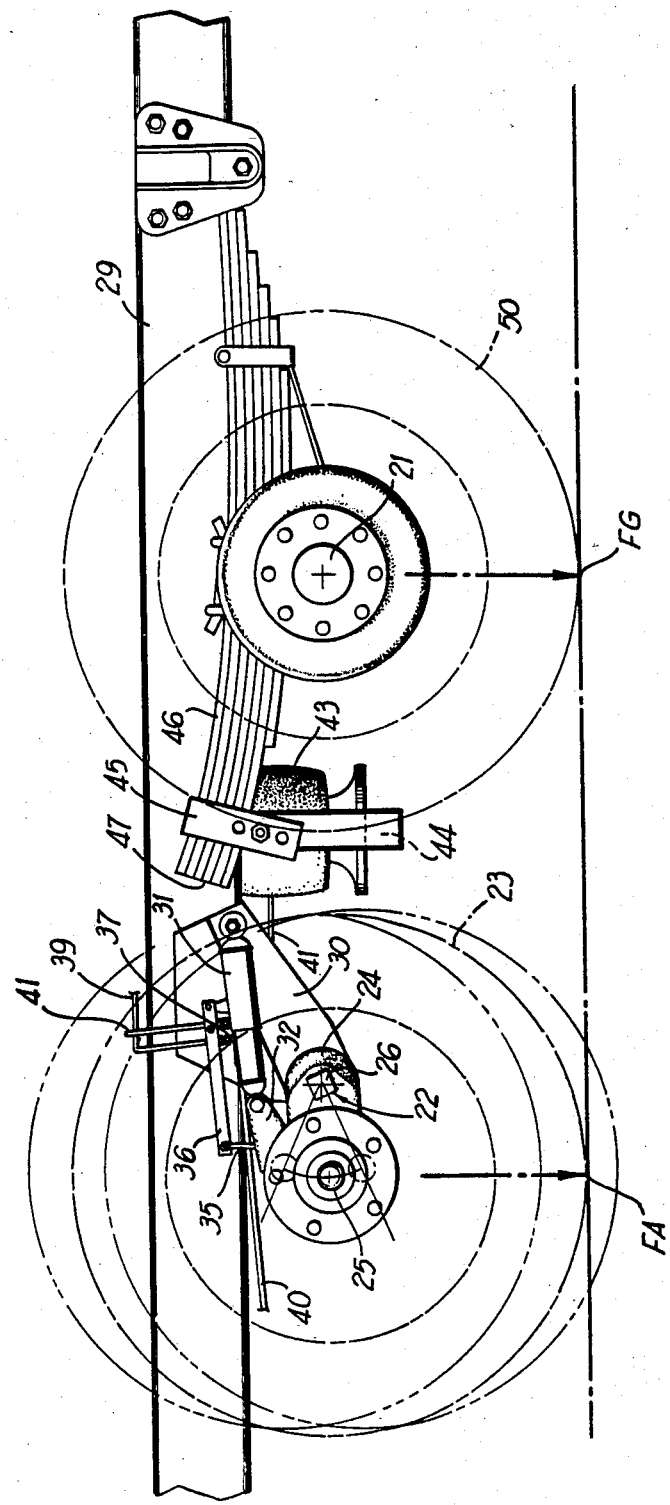
FIG. 4 is a side elevation of the suspension system.
Figure 5:
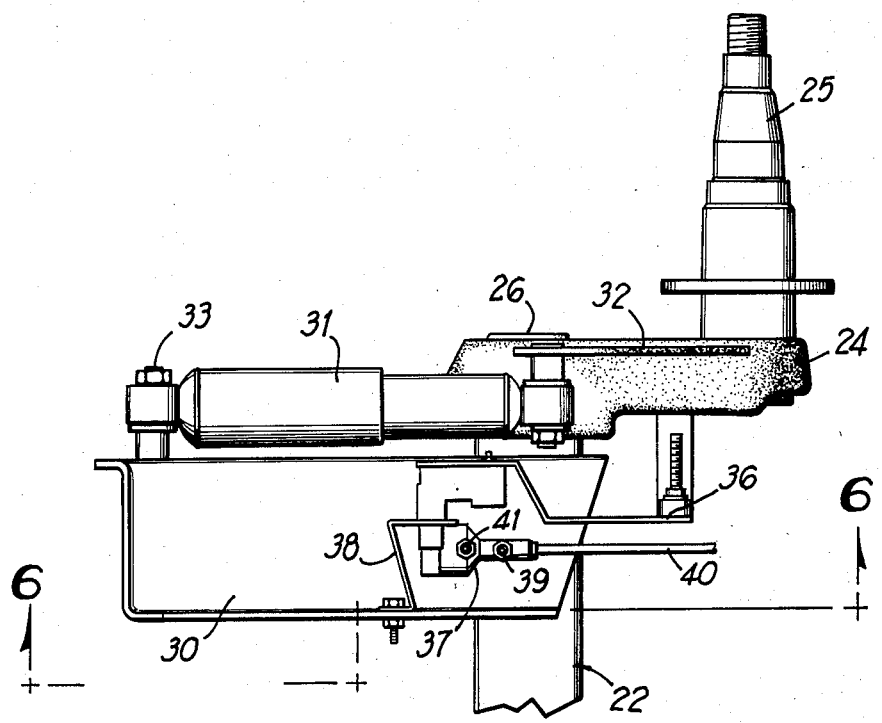
FIG. 5 is a fragmentary plan view of the tag axle assembly showing its bracketing to the chassis frame of the vehicle.
Figure 6:
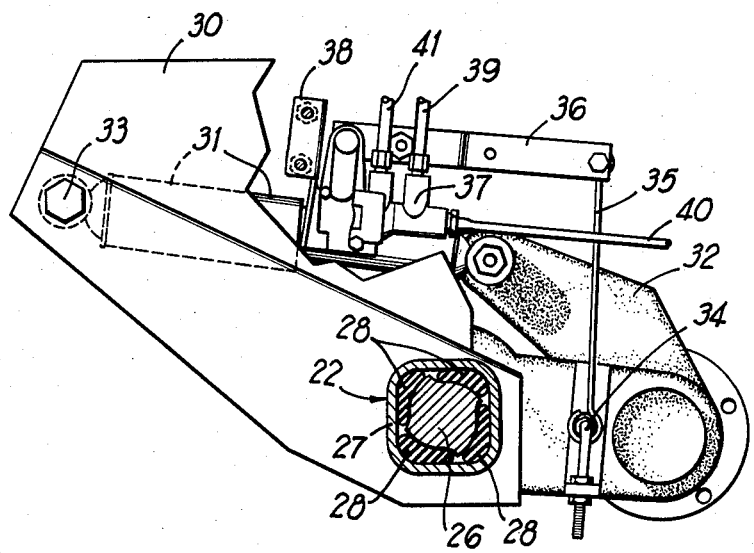
FIG. 6 is a vertical section taken through the tag axle assembly on line 6—6 of FIG. 5.

The operation of the load proportioning suspension system for vehicles according to the invention is briefly as follows:

FIG. 4 of the drawings depicts a desired vehicle stance under any loading within design parameters. Typically, a motor home 20 of the class to which the invention is applied could weigh 12,000 pounds empty and 16,000 pounds fully loaded. On increasing the vehicle load, additional weight is applied to the ground contact points, two of which points are indicated in FIG. 4 at FA and FG where the tag axle wheels 23 and drive axle wheels 50 make contact with the ground. The normal distance from the top of chassis rails 29 to the ground may be 28 inches. When the load on the vehicle is increased, the new or additional force at the point FA moves upwardly through the wheel 23 to spindle 25 causing the trailing arm 24 to rotate upwardly in the "loading" direction around the axis of square shaft 26 of the torsion axle 22. This movement of the arm 24 displaces the linkage connection 34, 35, 36 upwardly, moving the spool of valve 37 to the "fire" position. This allows compressed air from the line 39 to flow through the line 41 to the associated air springs 43, via line 49, it being understood that two air springs, two valves 37, two valve linkages 34, 35, 36, and two independently sprung tax axle arm 24 are involved.

The air springs 43 are then extended vertically and, being solidly supported on the beam 44, displace the chassis frame of the vehicle including rails 29 upwardly. This upward movement of the chassis frame relieves or reduces loading at the ground contact point FA. This diminished force or load allows the trailing arm 24 to rotate downwardly, or return to its original or specific load location. The load on the tag axle 22 is now at its original predetermined desired loading, which might be 3000 pounds. This tag axle loading is maintained constant in the described operation of the invention, in accordance with a very important objective of the invention of automatically dividing the vehicle load between the tag axle 22, the drive axle 21 and the front wheels of the vehicle 20. The increased load applied to the total vehicle 20 has now distributed itself automatically between the front and drive axle structures of the vehicle, thereby diminishing center of gravity variations. A decrease in loading on the vehicle will induce actions, or reactions, exactly opposite to those described above.

The above-described load dividing capability of the suspension system provides, among others, the following important advantages over the prior art: a smoother ride with improved handling, stability and braking; emergency lane changing can be carried out with remarkable stability and safety; and squatting or nose diving of the vehicle under braking is minimized.

A very important benefit derived from the invention is the prevention of lost traction due to lifting of the traction wheels 50 when the tag axle wheel or wheels 23 ascend a curb or incline. When this occurs, with the invention installed and operating, the system operates substantially as described to deliver pressurized fluid to the air springs 43, lifting the chassis frame, and transferring more weight onto the drive axle wheels 50 while relieving weight on the tag axle wheels 23 at point FA and quickly placing the desired weight or loading on the tag axle, such as 3000 pounds. This mode of operation is initiated when the tag axle wheels ascend a curb or incline, resulting in swinging one or both of the arms 24 upwardly in the "loading" direction as previously described. Since the two air springs 43 are interconnected to function as one spring, it matters not whether one or both of the independently sprung arms 24 is elevated to operate the system.

Similarly, when one or both tag axle wheels 23 descend into a ditch, the suspension system is quickly self-correcting within the limits of suspension design movement to restore the proper portion of the load, such as 3000 pounds, to the tag axle which load has momentarily diminished when the tag axle wheels enter a ditch or depression. The descending of the wheels 23 under these conditions and the resulting lowering of an arm or arms 24 causes the valve 37 to exhaust fluid from the air springs 43, relieving the lifting force on the chassis frame, reducing the force or weight at the point FG and transferring some of this weight to the tag axle wheels 23 now in a ditch or depression to maintain the optimum division of the load. This obviously stabilizes the vehicle and correctly distributes the vehicle weight, thus enabling the driver more readily to clear the ditch or depression.

It should be noted here that another advantage of the invention, derived from using the Henschen axle according to the referenced patents, is the minimizing of the unsprung vehicle load, due to the fact that the Henschen axle is very lightweight although extremely sturdy and reliable.

Still another advantage of the invention is the provision of a driver selectable range of variable braking forces on the tag axle 22 proportional to brake pedal effort. This is enabled by utilizing a conventional trailer brake control device and adapting the same to the hydraulics of the normal motor home brake system. This control device has a limited range of adjustment for the braking force applied to the tag axle wheels 23, which neither allows freewheeling nor equalized braking compared to the braking of drive or traction wheels 50. With minimum but proportional braking on the tag axle wheels, the vehicle maintains maximum directional stability on all types of road surfaces and weather conditions. With maximum but proportional driver selected braking, the vehicle is able to maximize the braking force of the vehicle applied to the road. The driver is enabled to realize total vehicle brake effectiveness under varying conditions of driving through the use of the system.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A load dividing suspension system for vehicles comprising a chassis frame, a drive axle assembly supportively connected with the chassis frame, a fluid-pressure responsive spring means on the drive axle assembly and engaging the chassis frame and exerting a variable lifting force thereon, a tag axle assembly attached to the chassis frame and including a vertically swingable support structure for wheels of the tag axle assembly, a distribution valve means on the vehicle for pressurized fluid from an on-board supply of such fluid and having a connection with said supply, an outlet connection and a pressurized fluid line leading to and connected with said fluid-pressure responsive spring means, and an operating linkage for said valve means connected between a movable control element of the valve means and said vertically swingable support structure.

2. A load dividing suspension system for vehicles as defined in claim 1, and said fluid-pressure responsive spring means comprising an air spring means, and said on-board supply of said pressurized fluid comprising a compressed air supply.

3. A load dividing suspension system for vehicles as defined in claim 1, and said vertically swingable support structure comprising a pair of independently vertically swingable tag axle wheel support arms, said valve means and said operating linkage comprising a dual valve means and dual linkage, one each for said support arms.

4. A load dividing suspension system for vehicles as defined in claim 3, and said fluid-pressure responsive spring means comprising a pair of interconnected air springs each having a connection through a compressed air supply line with one valve of said dual valve means.

5. A load dividing suspension system for vehicles as defined in claim 1, and said drive axle assembly comprising a leaf spring drive axle assembly, a transverse support beam carried by the leaf spring drive axle assembly at an elevation below the chassis frame, and said fluid-pressure responsive spring means resting on said transverse support beam.

6. A load dividing suspension system for vehicles as defined in claim 5, and said fluid-pressure responsive spring means comprising a pair of laterally spaced air springs.

7. A load dividing suspension system for vehicles as defined in claim 5, and means suspending said support beam from the leaf springs of the leaf spring drive axle assembly, the rear end portions of the leaf springs extending rearwardly by substantially the same distance, and the rear end portions of the leaf springs being connected with the chassis frame through said support beam and said fluid-pressure responsive spring means.

8. A load dividing suspension system for vehicles as defined in claim 3, and said tag axle assembly comprising a torsion-type axle assembly in which the independently vertical swingable wheel support arms comprise torsional resistance activating elements.

9. In a multi-axle suspension system for motor homes, buses and the like, a chassis frame, front steering wheel means and at least a drive axle assembly supportively connected with said chassis frame, air spring support means for the chassis frame carried by the drive axle assembly and exerting a lifting force on the chassis frame, a tag axle assembly connected with the chassis frame behind the drive axle assembly and having pivoted arms which rise and fall independently with the wheels of the tag axle assembly, linkage means connected with and operated by said pivoted arms of the tag axle assembly, and pneumatic pressure control valve means connected with said linkage means and said air spring support means and being operable in response to variations in load applied to the chassis frame to maintain a substantially constant portion of such load applied to the tag axle assembly.

10. In a multi-axle suspension system as defined in claim 9, and the tag axle assembly including a torsion axle with which said pivoted arms are independently connected for torsional resistance in their movements.

11. In a multi-axle suspension system as defined in claim 10, and the torsion axle including a polygonal axle tube, elastic rod-like elements within said tube, and polygonal shafts on said arms and extending into said axle tube and being in rotational compressive engagement with said elastic rod-like elements.

12. In a multi-axle suspension system as defined in claim 9, and said pneumatic pressure control valve means comprising an on-board source of compressed air including a supply line between said source and said control valve means, a delivery line for air connected between the control valve means and said air spring support means, and an outlet line connected with and leading from the control valve means.

13. In a multi-axle suspension system as defined in claim 9, and said linkage means and said pneumatic pressure control valve means comprising a dual linkage and dual valve means one for each of said pivoted arms.

14. A vehicular suspension system comprising a chassis frame, a drive axle assembly on and supporting the chassis frame, a tag axle assembly on the chassis frame in spaced relationship to the drive axle assembly and having a supportive relationship to the chassis frame, and means responding to variations in vehicle loading on the chassis frame to automatically maintain a predetermined constant portion of the vehicular load on the tag axle assembly in all conditions of loading between maximum and minimum loading.

15. A vehicular suspension system as defined in claim 14, and said means comprising fluid-pressure means including a variable pressure spring means connected with said drive axle assembly and exerting a variable lifting force on the chassis frame to maintain the chassis frame at a predetermined desired elevation.

* * * * *